United States Patent
Takita et al.

(10) Patent No.: US 7,112,908 B2
(45) Date of Patent: Sep. 26, 2006

(54) ROTOR FOR SYNCHRONOUS INDUCTION MOTOR, SYNCHRONOUS INDUCTION MOTOR, FAN MOTOR, COMPRESSOR, AIR CONDITIONER, AND REFRIGERATOR

(75) Inventors: Yoshio Takita, Tokyo (JP); Hitoshi Kawaguchi, Tokyo (JP); Hayato Yoshino, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 126 days.

(21) Appl. No.: 10/265,697

(22) Filed: Oct. 8, 2002

(65) Prior Publication Data

US 2003/0107288 A1    Jun. 12, 2003

(30) Foreign Application Priority Data

Oct. 11, 2001    (JP)    ............................. 2001-313517

(51) Int. Cl.
*H02K 17/16* (2006.01)

(52) U.S. Cl. ................. 310/211; 310/261; 310/156.53; 310/156.56; 310/156.78

(58) Field of Classification Search ........ 310/210–213, 310/261, 162, 163, 166, 168, 156.53, 156.56, 310/156.78, 156.84
See application file for complete search history.

(56) References Cited

U.S. PATENT DOCUMENTS

| | | | | |
|---|---|---|---|---|
| 2,802,124 A | * | 8/1957 | Sjoblom | ..................... 310/211 |
| 2,846,601 A | * | 8/1958 | Jacobs | ........................ 310/211 |
| 2,913,607 A | * | 11/1959 | Douglas et al. | ............. 310/261 |
| 2,975,310 A | * | 9/1961 | Armstrong et al. | ......... 310/163 |
| 3,045,135 A | * | 7/1962 | Honsinger | ................... 310/212 |
| 3,047,755 A | * | 7/1962 | Angst et al. | ................. 310/162 |
| 3,210,584 A | * | 10/1965 | Jorgensen et al. | .......... 310/265 |
| 4,371,802 A | * | 2/1983 | Morrill | ....................... 310/166 |
| 5,893,205 A | * | 4/1999 | McClelland | ................. 29/598 |
| 5,952,757 A | * | 9/1999 | Boyd, Jr. | ............... 310/156.81 |
| 6,259,181 B1 | * | 7/2001 | Kawano et al. | ............. 310/162 |
| 6,300,703 B1 | | 10/2001 | Kawano et al. | ............. 310/162 |

FOREIGN PATENT DOCUMENTS

| | | |
|---|---|---|
| JP | 61-199177 | 12/1986 |
| JP | 61-199178 | 12/1986 |
| JP | 9-191618 | 7/1997 |
| JP | 10-257732 | 9/1998 |
| JP | 11-127560 | 5/1999 |
| JP | 2000-197325 | 7/2000 |

(Continued)

*Primary Examiner*—Dang Le
(74) *Attorney, Agent, or Firm*—Oblon, Spivak, McClelland, Maier & Neustadt, P.C.

(57) ABSTRACT

There are problems in a rotor having a slit that it is difficult to increase the number of rotations of the rotor, since the centrifugal force is received at both ends of the slit, and if the connection part is made thick to increase the number of rotations, the properties of the motor is deteriorated. According to the present invention, a rotor for a synchronous motor includes a slot for generating induction torque and a slit for generating reluctance torque, the slit is filled with a filler, the slit is provided with at least one of a convex and a concave, so that the convex and the concave are formed so as to receive the centrifugal force which is generated by the rotation of the rotor and acts on a part of the rotor outside the slit and the filler so as to bulge toward the outside from the center side of the rotor by mechanical bondage of the filler and the rotor core.

28 Claims, 9 Drawing Sheets

1 : ROTOR
2 : SLIT
3 : OUTPUT AXIS
4 : OPENING

FOREIGN PATENT DOCUMENTS

| | | |
|---|---|---|
| JP | 2001-186735 | 7/2001 |
| JP | 2001-251825 | 9/2001 |
| JP | 2001-258220 | 9/2001 |
| JP | 2001-258222 | 9/2001 |

* cited by examiner

1 : ROTOR
2 : SLIT
3 : OUTPUT AXIS
4 : OPENING

13 : SLOT

2a : FIRST SLIT
2b : SECOND SLIT
2c : THIRD SLIT
5 : CONVEX

6 : CONCAVE

14 : SUPPORTING MEMBER

15 : FIXING MEMBER
17 : SUPPORTING MEMBER INSERTING HOLE
18 : OUTPUT AXIS INSERTING HOLE

11 : END RING

Fig. 14
RELATED ART
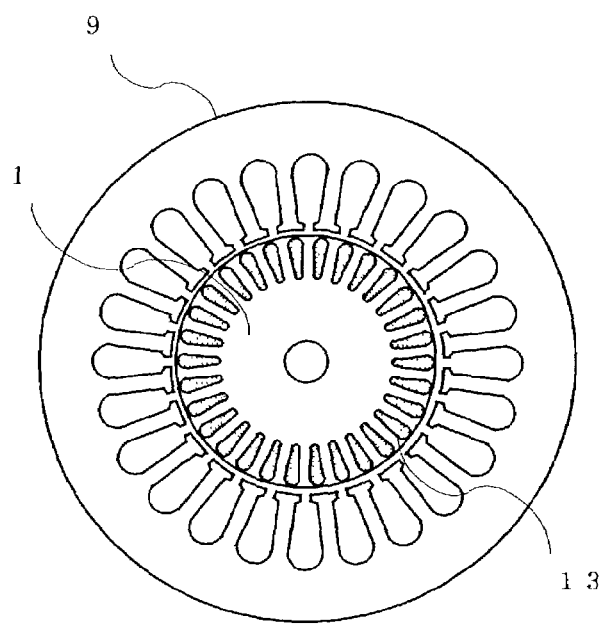
Fig. 15A
RELATED ART
Fig. 15B
RELATED ART
Fig. 15C
RELATED ART
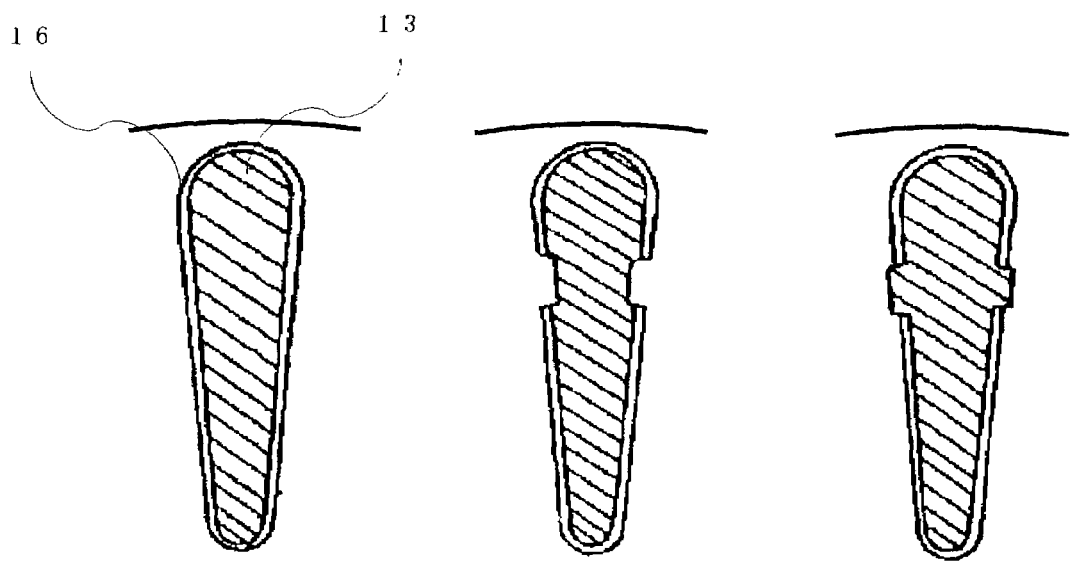

ROTOR FOR SYNCHRONOUS INDUCTION MOTOR, SYNCHRONOUS INDUCTION MOTOR, FAN MOTOR, COMPRESSOR, AIR CONDITIONER, AND REFRIGERATOR

BACKGROUND OF THE INVENTION

1. Field of the Invention

The present invention relates to, for example, a rotor of a synchronous induction motor which starts using induction torque and performs synchronous operation using reluctance torque and devices employing the rotor.

2. Description of the Related Art

FIGS. 11 through 13 show a conventional synchronous motor (4 poles): FIG. 11 shows a cross section viewed from an output axis of the synchronous motor; FIG. 12 shows a cross section viewed from a side of the output axis of the synchronous motor; and FIG. 13 shows a cross section of a rotor of the synchronous motor. In the figures, a reference numeral 1 shows a rotor which is fixed to an output axis 3 by such as press fit and formed by laminating in an axial direction. A reference numeral 12 shows a slit which is provided in parallel with another slit in the radial direction so as to become projected toward the center, which is magnetically insulated so as to magnetically induce from a magnetic pole at the rotor 1 to a next magnetic pole.

A reference numeral 9 shows a stator formed by laminating electromagnetic steel plates in the axial direction. 10 shows a coil wound around the stator 9, and a rotation magnetic field is generated by inducing electric current to the coil 10. A part B in FIG. 13 shows a thin connection part, which is a part of a periphery of the rotor 1 and is partially connected to another connection part so as not to separate by slits 12, and which holds the strength of the rotor. The partial connection of the thin connection part can be provided at each part of the rotor 1 to support the strength of the rotor within a range not to disturb the magnetic properties of the motor.

In the synchronous motor formed as described above, it is possible to generate rotation power of the rotor 1 by running exciting current to the coil 10 of the stator 9 so that magnetomotive force acts in direction of the magnetic pole of the magnetic field of the rotor 1. In case of the motor shown in FIG. 11, the rotor rotates following (synchronizing) the rotation magnetic field which is generated by the coil 10 of the stator 9 due to the reluctance torque.

When the rotational position of the rotor 1 is detected using such as a rotational position detector, the magnetic field flux and the torque current can be controlled arbitrarily and precisely, so that it can be said that the synchronous motor is good in controllability as well as a permanent magnet synchronous motor which is highly effective. Further, compared with the induction motor which is generally used, the synchronous motor shown in FIG. 11 does not need secondary electric current running to the rotor, and loss of the rotor is small since there is no rotor copper loss, which makes the motor highly effective.

The conventional synchronous motor is formed as described above, so that there are following problems.

In the rotor 1 of the synchronous motor shown in FIG. 11, the slit 2 is provided to achieve the above performance so as to generate reluctance torque. Accordingly, to keep the form of the rotor, the thin connection part is provided at both ends of the slit 12, fixed mechanically, and the strength can be kept. However, to increase the strength enough to withstand the centrifugal force due to the high-speed rotation, it is necessary to make thick the thin connection part and to increase the number of the thin connection parts.

Further, at each of the thin connection parts of the rotor 1 of the synchronous motor shown in FIG. 11, the magnetic flux, which is functionally unnecessary, is induced, which causes problems such as reduction of generated torque or low efficiency.

Various methods have been developed and proposed to provide the enough strength to withstand the centrifugal force due to the high-speed rotation with the rotor of the synchronous motor shown in FIG. 11.

For example, the Japanese unexamined patent publication No. JP09-191618 discloses a method to fill the slit with nonmagnetic and electrically nonconductive material to solidify the material. The strength may be increased at some extent by the filler according to this method, however, the bondage between the rotor and the filler cannot be sufficient by simple solidification of the filler. There may be another problem that the increase of the centrifugal force due to the added weight of the filler is larger than the bondage according to the dispersion at the mass production of the rotor and that the strength of the rotor must be increased on the contrary.

FIG. 14 and FIGS. 15A through 15C show methods disclosed by the Japanese Utility Gazette Nos. JP61-199177 and JP61-19917815, respectively, in which a concave and a convex are provided at a side of an aluminum bar of an induction motor. These methods are effective to eliminate a gap between the aluminum and the rotor to prevent the breakage of the aluminum bar due to the vibration. However, the stress concentration to the thin connection part cannot be relieved, since the centrifugal force is received at a thin connection part regardless of the existence of the concave and the convex.

SUMMARY OF THE INVENTION

The present invention aims to provide the rotor of the synchronous induction motor which can withstand the centrifugal force of the high-speed rotation without decreasing the properties of the motor using a simple construction and further aims to provide devices employing the rotor of the invention.

According to the present invention, in a rotor for a synchronous induction motor having a slot for generating induction torque and a slit for generating reluctance torque and filling the slit with a filler, the slit is provided with at least one of a convex and a concave so as to receive centrifugal force, which is generated due to rotation of the rotor and acts on a part of the rotor outside the slit and the filler so as to bulge toward an outside from a center side of the rotor, by mechanical bondage of the filler and a rotor core.

In the rotor for the synchronous induction motor of the invention, a shape of the convex and the concave are made to have a wedge form in which a top part is wider than a bottom part.

In the rotor for the synchronous induction motor of the invention, a shape of the convex and the concave are made circular.

In the rotor for the synchronous induction motor of the invention, a shape of the convex and the concave are made T-shape.

In the rotor for the synchronous induction motor of the invention, a shape of the convex and the concave are made L-shape.

In the rotor for the synchronous induction motor of the invention, the rotor has a plurality of slits, and a slit of the center side of the rotor of the plurality of slits is provided with at least one of a convex and a concave.

In the rotor for the synchronous induction motor of the invention, one of plural convexes and plural concaves are provided at one side of the slit.

In the rotor for the synchronous induction motor of the invention, a convex is provided at one side of the slit and a concave is provided at an opposite side of the slit so as to place the convex and the concave to keep a magnetic path of the slit.

In the rotor for the synchronous induction motor of the invention, the rotor has plural slits, wherein the plural slits are provided with at least one of a convex and a concave.

In the rotor for the synchronous induction motor of the invention, the slot is placed both ends of the slit at outer peripheral side of the rotor, and the slot and the slit are connected.

In the rotor for the synchronous induction motor of the invention, the slot and the slit are connected with a continuous curve.

In the rotor for the synchronous induction motor of the invention, a narrow part is provided between the slot and the slit.

In the rotor for the synchronous induction motor of the invention, the slot and the slit are separated.

According to the present invention, in a rotor for a synchronous induction motor which is formed by laminating a blanking steel plate, an arbitrary part of the rotor in an axial direction has a structure of the invention.

In the rotor for the synchronous induction motor of the invention, one of or both of the slot and the slit is filled with nonmagnetic conductive material.

In the rotor for the synchronous induction motor of the invention, one of or both of the slot and the slit is filled with aluminum.

In the rotor for the synchronous induction motor of the invention, one of or both of the slot and the slit is filled with copper.

In the rotor for the synchronous induction motor of the invention, the slot is filled with nonmagnetic conductive material, and the slit is filled with nonmagnetic material or material having low magnetic permeability.

According to the present invention, in a rotor for a synchronous induction motor having a slot which is filled with conductive material and for generating induction torque and a slit for generating reluctance torque, a supporting member is inserted into the conductive material within the slot, and the rotor is formed so that the supporting member is made to receive centrifugal force, which is generated due to rotation of the rotor and acts on a part of the rotor outside the slit and the filler so as to bulge toward an outside from a center side of the rotor.

In the rotor for the synchronous induction motor of the invention, the supporting member is inserted into the slot which is located at a part where the rotor bulges out the most due to the centrifugal force.

In the rotor for the synchronous induction motor of the invention, the supporting member is inserted into plural slots.

In the rotor for the synchronous induction motor of the invention, the supporting member is formed by SUS (stainless steel).

In the rotor for the synchronous induction motor of the invention, the supporting member is formed by copper.

In the rotor for the synchronous induction motor of the invention, the rotor has an end ring which short-circuits conductive material of the slot, and the end ring is provided at both ends of the slot in an axial direction, and the end ring supports the supporting member.

In the rotor for the synchronous induction motor of the invention, the supporting member is inserted adjacent a center of the slot.

In the rotor for the synchronous induction motor of the invention, the supporting member is inserted so as to contact to the slot.

In the rotor for the synchronous induction motor of the invention, a fixing member having an inserting hole for the supporting member is provided at a predetermined position of the rotor, and the supporting member is inserted into and fixed to the inserting hole.

In the rotor for the synchronous induction motor of the invention, the fixing member is provided at both ends of the rotor in an axial direction.

In the rotor for the synchronous induction motor of the invention, the fixing member is provided inside the rotor in the axial direction.

In the rotor for the synchronous induction motor of the invention, a part of the fixing member in which the inserting hole for the supporting member is not provided is eliminated.

In the rotor for the synchronous induction motor of the invention, an output axis inserting hole is provided at the fixing member, and an output axis is fixed to the output axis inserting hole.

In the rotor for the synchronous induction motor of the invention, the slot is filled with conductive material, a supporting member is inserted into the conductive material within the slot, and the supporting member is made to receive centrifugal force which is generated due to rotation of the slot and acts on a part of the rotor outside the slit and the filler so as to bulge toward an outside from a center side of the rotor.

According to the present invention, in a rotor for a synchronous induction motor having slots for generating induction torque and slits for generating reluctance torque, both ends of the slots or the slits are connected with connection parts so as not to separate a rotor core because of the slots and the slits, one of the connection parts, on which a stress due to centrifugal force acted on a part of the rotor outside the slits and the filler so as to bulge toward the outside from the center side of the rotor is concentrated, is made thick, and the connection parts are made gradually thin toward the connection parts on which the stress is not concentrated.

In the rotor for the synchronous induction motor of the invention, a curve connecting each part of the connection parts at a center side of the rotor becomes ellipse.

In the rotor for the synchronous induction motor of the invention, only one of the connection parts, on which the stress due to centrifugal force is concentrated, is made thicker than the other of the connection parts.

In the rotor for the synchronous induction motor of the invention, not only the one of the connection parts on which the stress due to centrifugal force is concentrated but also a connection part of the connection parts on which the stress is secondarily concentrated is made thicker than the other of the connection parts.

In the rotor for the synchronous induction motor of the invention, at least one of the connection parts is made to have the least thickness so as to keep properties of the synchronous induction motor.

In the rotor for the synchronous induction motor of the invention, the rotor has slots and slits, both ends of the slots or the slits are connected with connection parts so as not to separate a rotor core because of the slots and the slits, one of the connection parts, on which a stress due to centrifugal force acted on a part of the rotor outside the slits and the filler so as to bulge toward the outside from the center side of the rotor is concentrated, is made thick, and the connection parts are made gradually thin toward the connection parts on which the stress is not concentrated.

In the rotor for the synchronous induction motor of the invention, the rotor has slots and slits, both ends of the slots or the slits are connected with connection parts so as not to separate a rotor core because of the slots and the slits, one of the connection parts, on which a stress due to centrifugal force acted on a part of the rotor outside the slits and the filler so as to bulge toward the outside from the center side of the rotor is concentrated, is made thick, and the connection parts are made gradually thin toward the connection parts on which the stress is not concentrated.

According to another aspect of the present invention, a synchronous induction motor employs the rotor for the synchronous induction motor of the invention.

According to another aspect of the present invention, a fan motor employs the synchronous induction motor of the invention.

According to another aspect of the present invention, a compressor employs the synchronous induction motor of the invention.

According to another aspect of the present invention, in an air conditioner, a fan motor employing the synchronous induction motor of the invention and a compressor employing the synchronous induction motor of the invention are mounted.

According to another aspect of the present invention, in a refrigerator, a fan motor employing the synchronous induction motor of the invention and a compressor employing the synchronous induction motor of the invention are mounted.

In the rotor for the synchronous induction motor of the invention, a slot is provided at a position which is the furthest from a center of an inner periphery of the rotor, and a slit is provided at a position which is the same as the slot or inside the slot.

BRIEF EXPLANATION OF THE DRAWINGS

A complete appreciation of the present invention and many of the attendant advantages thereof will be readily obtained as the same becomes better understood by reference to the following detailed description when considered in connection with the accompanying drawings, wherein:

FIG. 14 is a cross section of a slot of a conventional induction motor; and

FIGS. 15A, 15B, and 15C are cross sections of a slot of a conventional induction motor.

DESCRIPTION OF THE PREFERRED EMBODIMENT

Hereinafter, the preferred embodiment of the present invention will be explained referring to the figures.

Embodiment 1

Figure 1A:
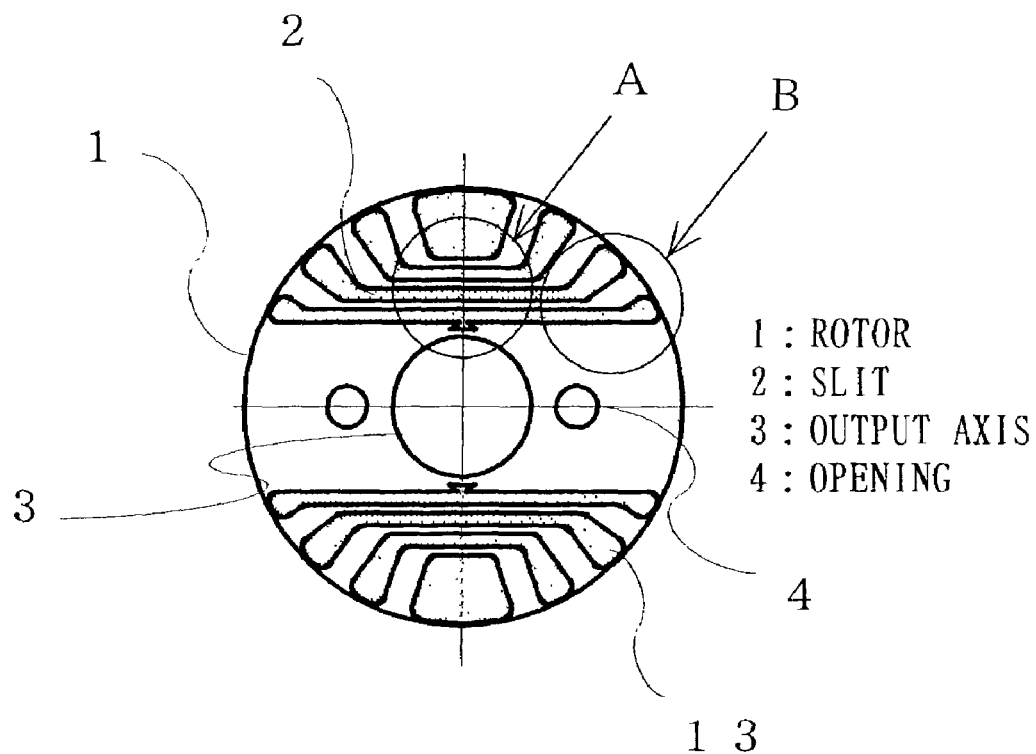
FIGS. 1A and 1B show cross sections of a rotor of a synchronous motor according to the first embodiment of the invention.
Figure 1B:
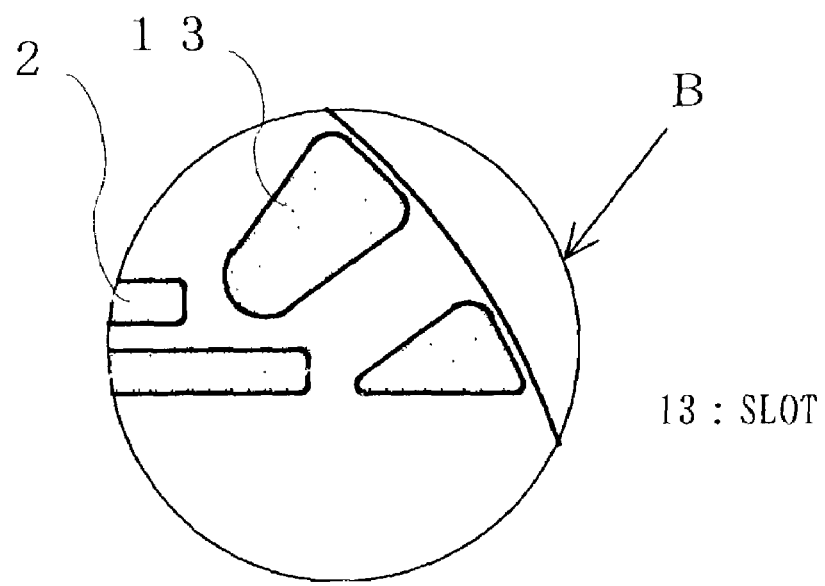
Figure 2:
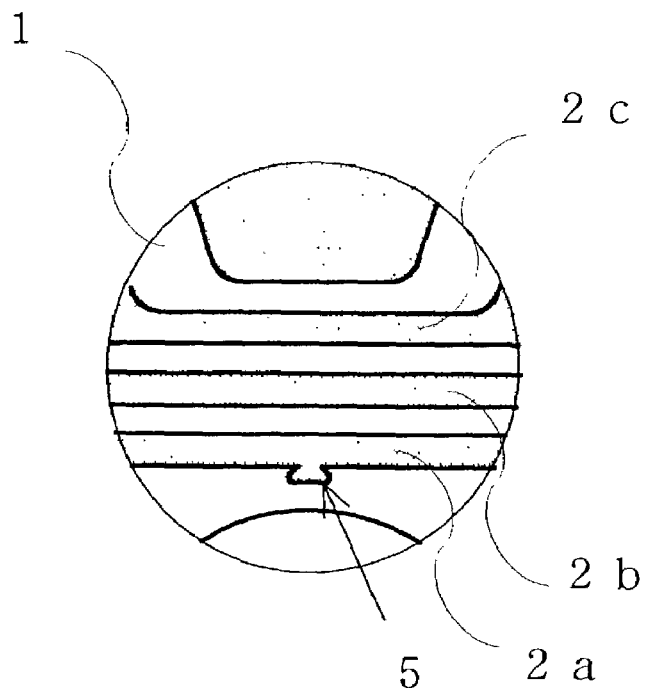
FIG. 2 is an enlarged view of a part A of FIG. 1 when a convex is provided at a slit according to the first embodiment.
Figure 3:
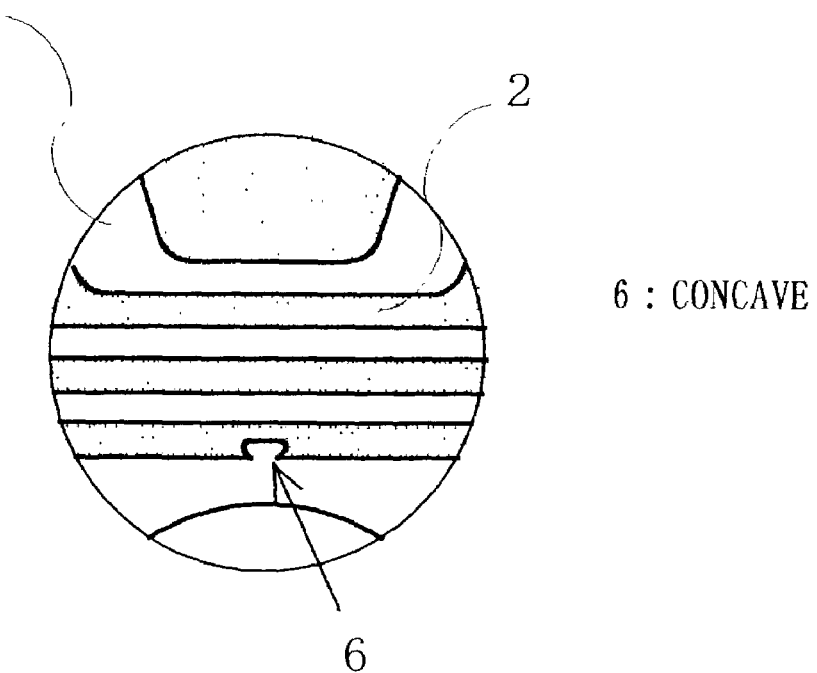
FIG. 3 is an enlarged view of the part A of FIG. 1 when a concave is provided at the slit according to the first embodiment.

FIGS. 1A, 1B, 2 and 3 show the first embodiment of the invention: FIG. 1A shows a cross section of a rotor of a synchronous induction motor; FIG. 2 shows an enlarged view of a part A of FIG. 1A in which a slit is provided with a convex; and FIG. 3 shows another enlarged view of the part A of FIG. 1A in which a slit is provided with a concave. In FIGS. 1A and 2, a reference numeral 1 shows a rotor which is fixed to an output axis 3 by such as press-fit and formed by laminating in an axial direction. A reference numeral 13 shows a slot which is filled with nonmagnetic conductive material such as aluminum and is located at a place which is the farthest from a center of the rotor 1 on an inner circumference, so that secondary electric current flows to generate induction torque at start or asynchronous operation of the motor. The slot 13 can be of any shape as long as necessary induction torque can be generated according to specifications of the synchronous induction motor. A reference numeral 2 shows a slit which is magnetically isolated so as to magnetically induce from a magnetic pole at which the rotor 1 is placed to a next magnetic pole. As well as the slot 13, the slit 2 is filled with nonmagnetic conductive material such as aluminum. The slit 2 is placed at the same place at or inside the slot 13. The slit 2 can be of any shape, for example, not limited to a linear form as shown in FIGS. 1A and 1B, as long as necessary reluctance torque can be generated according to the specification of the synchronous induction motor. Further, the slit 2 and the slot 13 are connected by a continuous curve, so that respective functions can be enhanced each other. A reference numeral 5 shows a convex which is mechanically bonded to the material filled in the slit 2, and the convex 5 has a wedge form of which a top is wider than a bottom, so that the convex 5 can be also mechanically bonded against a force in the direction of placing the convex 5.

In FIG. 2, a slit which is placed at the nearest to the output axis 3 is referred to as a first slit 2a, and slits placed outside the slit 2a are respectively called a second slit 2b and a third slit 2c. Further, the slots 13 which are placed contacted to or adjacent to both ends of each slit is respectively called a first slot, a second slot, and so on. So as not to separate each part of the rotor 1 by the slit 2 or the slot 13, each part of the rotor is connected with each other by a connection part of the periphery of the rotor, which holds the strength of the rotor.

As the rotor 1 rotates, the centrifugal force is acted on the rotor 1. Since the rotor 1 is divided by the slit 2 and the slot 13, the centrifugal force acted on a part of the rotor 1 which is outside the slit 2 and the slot 13 is directed from the center of the rotor 1 towards the outside the rotor 1. Accordingly, the stress is concentrated on the connection part of the periphery of the rotor 1. Further, the centrifugal force acted on the aluminum filled in the slit 2 and the slot 13 is directed to the outside when viewed from the center of the rotor, so that the force is received by a strip between the slit 2 and the slot 13. Therefore, larger stress is acted on the connection part of both ends of the slit 2 or the slot 13 (in the direction connecting the center of the rotor 1 and the convex 5 in FIG. 1A). Consequently, a large stress is acted on the connection part provided at the both ends of the first slit 2a or the slot 13 which is the nearest to the center. As the number of rotations of the rotor 1 increases, the centrifugal force becomes large, and the stress acted on the connection part also becomes large.

By filling the slit 2 with aluminum and so on, there is possibility that the stress acted on the connection part is relieved, since the stress due to the centrifugal force caused by bonding aluminum and the rotor is also acted on the bonding part. However, the connection part is not always connected because of the dispersion of the mass production.

In order to bond aluminum and the rotor firmly, the convex 5 having a wedge form is provided at the slit 2 so that a part of the stress acted on the rotor 1 is caught by the slit 2a in the direction of the centrifugal force, and aluminum and the rotor are mechanically bonded. By this mechanical bondage, the centrifugal force which has been received by the strip outside the first slit 2a is now received also by the convex 5 placed inside the first slit 2a.

Formed as discussed above, the centrifugal force of aluminum of the first slit 2a which has been received by the connection part provided at both ends of the first slit 2a or the slot 13 is now received by the connection part and also by the convex 5, so that the number of rotations of the rotor can be increased even with the connection part having the same thickness. If the number of the rotations is the same, it is possible to make the connection part thin so as to improve the properties of the motor.

It is easy to fill the slit with aluminum by filling with die casting method or liquid metal forging method even if the slit has a convex or a concave, and there is no need to change a die (to remake a die) because of providing the convex or the concave.

It is not required any additional cost to produce the rotor 1 having the slit 2 with the convex 5, since the conventional manufacturing process can be used and only a die for the rotor 1 should be replaced or treated additionally.

In the first embodiment, a case has been discussed in which the convex 5 is provided at the slit 2, and the same effect can be attained by providing the concave 6 at the slit 2 as shown in FIG. 3. The concave 6 also has a wedge form of which a top is wider than a bottom.

Further, aluminum is used for the filler in the first embodiment, the filler can be another material such as copper; the same effect can be attained using nonmagnetic conductive material.

In the first embodiment, the same aluminum is used to fill the slit 2 and the slot 13, however, different material can be used to fill in the slit 2 and the slot 13, respectively. For example, the slot 13 is filled with aluminum by such as die casting method, and the slit 2 is filled with another material, for example, copper by die casting method. In this case, before filling the slot 13, the slit 2 should be covered so that the filler for the slot 13 cannot enter, and it is possible to completely separate the filler for the slit 2 and the slot 13. The filler for the slit 2 is not limited to conductive material.

In the first embodiment, the filler has been discussed as nonmagnetic material, however, it is as well effective to use magnet, etc. which has low magnetic permeability. In this case, a space for the magnet should be previously provided, and it is possible to easily install the magnet if the magnet has been processed to fit to the shape of the concave or the convex of the slit and is inserted into the slit.

Further, in the first embodiment, one concave or one convex is provided at the slit 2, however, the same effect can be attained by providing more than two concave or convex. There is no problem to change the number or the shape of the concave or convex according to the number of rotations of the rotor 1 and the properties of the motor.

In the first embodiment, in order that a secondary resistance is decreased by making secondary electric current running in the slot 13 run into the slit 2 to generate induction torque and that the reluctance torque is increased by making the slot 13 have a function of the slit 2 to generate reluctance torque, the slit 2 and the slot 13 are connected with a continuous curve. However, another shape can be employed to attain the same effect in which the slit and the slot are connected with a narrow portion or the slit and the slot are placed with a gap as shown in FIG. 1B. In this case, the stress, which has been received by only the connection part of the slot 13, can now be received also by a part of the gap between the slit and the slot. Therefore, the strength of the rotor can be increased.

In the present embodiment, the shape of all blanking steel plates for the rotor are formed identical, however, the same effect can be attained if an arbitrary piece of the blanking steel plates of the rotor is made to have the above form. In this case, it is necessary to adjust a position for inserting the arbitrary piece of the blanking steel plates having the above form according to the number of rotations of the rotor or the properties of the motor.

The synchronous induction motor of the embodiment has good recycling efficiency because the magnet is not used.

Since the synchronous induction motor employing such a rotor does not generate rotor copper loss of the rotor at synchronous operation, which enables the synchronous induction motor to drive at a high efficiency. Accordingly, the synchronous induction motor is suitable to use in a fan motor, a compressor, an air conditioner, a refrigerator, and so on.

Embodiment 2

Figure 4A:
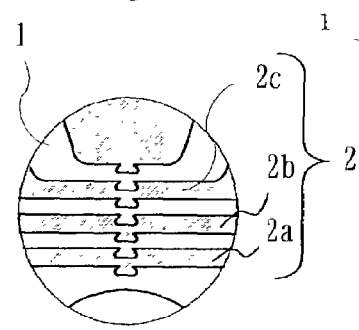
FIGS. 4A, 4B, and 4C are enlarged views of the part A of FIG. 1 when a convex or a concave is provided at plural slits according to the second embodiment.
Figure 4B:
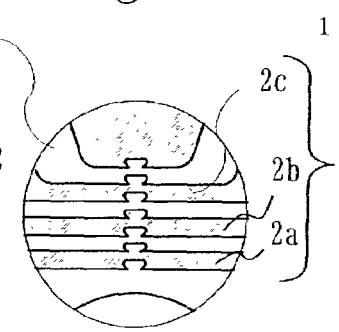
Figure 4C:
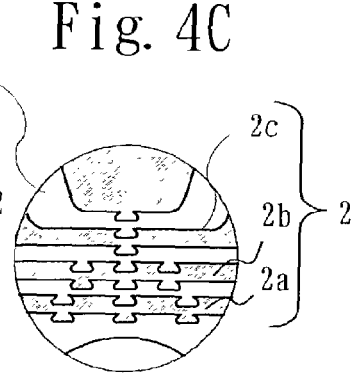
Figure 5A:
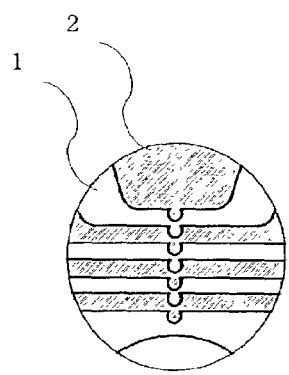
FIGS. 5A, 5B, and 5C are enlarged views of the part A of FIG. 1 when a convex or a concave provided at the slit has a form being other than a wedge according to the second embodiment.
Figure 5B:
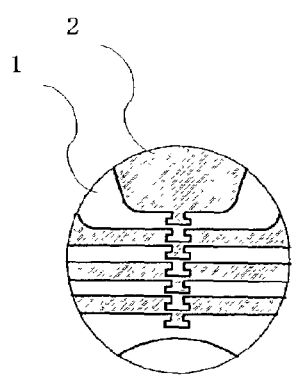
Figure 5C:
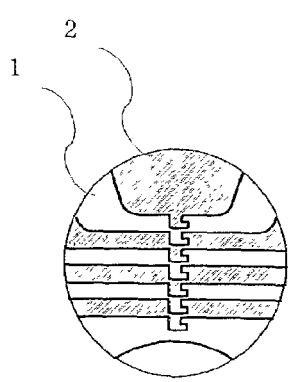

FIGS. 4A, 4B, and 4C and FIGS. 5A, 5B, and 5C show the second embodiment of the invention. An element having the same sign as the one as explained in the first embodiment has the same function, so that an explanation is omitted here. FIGS. 4A, 4B, and 4C are enlarged views of the part A of FIG. 1A when a convex or a concave is provided at plural slits, and FIGS. 5A, 5B, and 5C are enlarged views of the part A of FIG. 1A when a convex or a concave provided at the slit has a form being other than a wedge.

In FIG. 4A, as well as the first embodiment, a convex having a wedge form is provided so that the slit of the rotor 1 is caught by the slit 2a in the direction of the centrifugal force, and the rotor 1 and aluminum of the filler in the slit are mechanically bonded, and another convex having a wedge form is provided at an opposite side of the first slit 2a. In the same way, a convex and a concave are provided at the second slit 2b and the third slit 2c.

Providing the convex and the concave as discussed above, the convex and the concave of the first slit 2a receive the centrifugal force outside the aluminum filled in the first slit 2a and the first slit 2a itself. Similarly, the convex and the concave of the second slit 2b receive the centrifugal force outside the aluminum filled in the second slit 2b and the second slit 2b itself.

Formed as explained above, the centrifugal force, which has been received only at the connection part of the slit 2 and the slot 13, can be received at the convex and the concave of each slit, which relieves the stress concentrated on the connection part and enables to increase the number of rotation of the rotor.

An area of a part of the rotor which is separated by the slit 2 and in which the magnetic flux flows is not changed because the convex is provided at one side of the slit and the concave is provided at the opposite side. Therefore, the same amount of the area for the magnetic path can be kept, and the performance of the motor is not decreased.

To fill the slit with aluminum, it is easy to fill using the die casting method or the liquid metal forging method even if the slit has the convex and the concave.

Further, if the number of rotations is the same, the thickness of the thin connection part can be decreased, which improves the properties of the motor.

Further, positions of the convex and the concave can be switched to obtain the same effect as shown in FIG. 4B.

Further, in the second embodiment, the directions of the convex and the concave are made identical, however, there is no problem if an arbitrary form or an arbitrary direction is used according to the form of the slit or the property of the motor.

Further, in the second embodiment, one pair of the convex and the concave is provided each slit, however, plural pairs of the convex and the concave can be provided as shown in FIG. 4C. There is no problem to change the number or the shape of the convex and the concave according to the number of rotations of the rotor 1 or the properties of the motor.

Further, the convex of the slit 2 can be formed only by replacing the die of the rotor, which enables to manufacture the rotor with the same manufacturing process and cost.

Further, the convex and the concave of the present embodiment are formed as a triangular wedge, any form can be employed as shown in FIGS. 5A through 5C as long as a form can supply the power of bonding the rotor and the aluminum of the filler of the slit against the centrifugal force such as a circle, a T-shape, a L-shape.

Further, in the second embodiment, aluminum is used for the filler, however, the same effect can be obtained by using another nonmagnetic conductive material such as copper.

Further, in the second embodiment, the same aluminum is filled in both of the slit 2 and the slot 13, however, the same effect can be obtained if different material is filled in the slit 2 and the slot 13, respectively. For example, the slot 13 is filled with aluminum by the die casting method, and the slit 2 is filled with different material, for example, copper by the die casting method. In this case, it is possible to certainly separate the filler of the slit 2 and the one of the slot 13 by filling the slot 13 after covering the slit 2 so as not to induce the filler of the slot 13 into the slit 2. Here, the filler for the slit 2 is not limited to conductive material.

Further, in the second embodiment, the filler is nonmagnetic body, however, another material such as magnet which has low magnetic permeability can be used to obtain the same effect. It is possible to easily install the magnet if the magnet is processed so as to fit to the shape of the convex and the concave of the slit.

Further, in the second embodiment, the slit and the slot are connected with a continuous curve, however, the same effect can be obtained if a narrow part or a gap is provided between the slit and the slot.

In the present embodiment, the shape of all blanking steel plates for the rotor are formed identical, however, the same effect can be attained if an arbitrary piece of the blanking steel plates of the rotor is made to have the above form. In this case, it is necessary to adjust a position for inserting the arbitrary piece of the blanking steel plates having the above form according to the number of rotations of the rotor or the properties of the motor.

Since the synchronous induction motor employing such a rotor does not generate rotor copper loss of the rotor at synchronous operation, which enables the synchronous induction motor to drive at a high efficiency. Accordingly, the synchronous induction motor is suitable to use in a fan motor, a compressor, an air conditioner, a refrigerator, and so on.

Embodiment 3

Figure 6A:
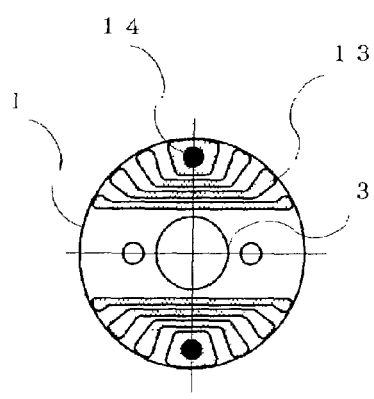
FIGS. 6A and 6B are cross sections of a rotor of a synchronous induction motor according to the third embodiment.
Figure 6B:
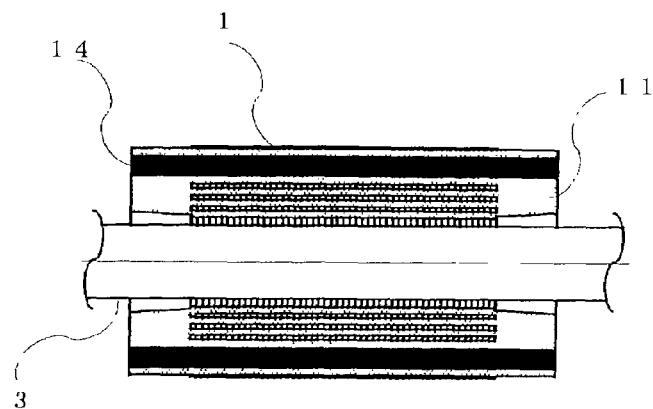
Figure 7:
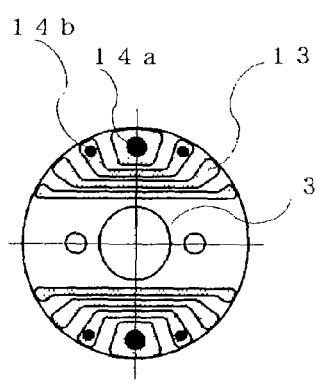
FIG. 7 is a cross section of a rotor of a synchronous induction motor, of which a supporting member is inserted in plural slots according to the third embodiment.
Figure 8A:
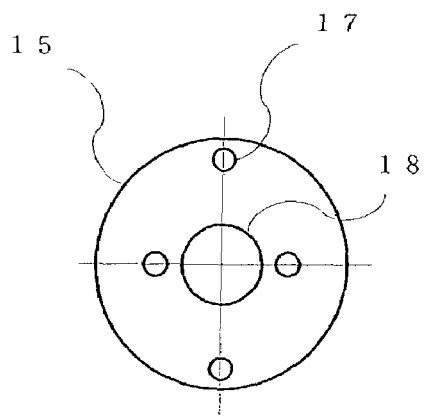
FIGS. 8A and 8B show a fixing member according to the third embodiment.
Figure 8B:
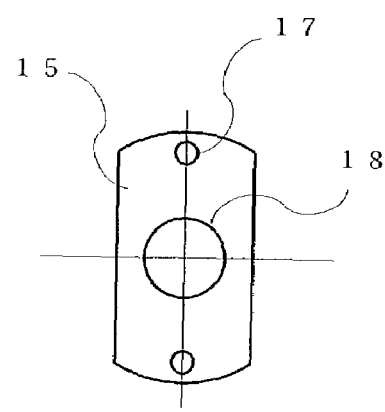
Figure 9A:
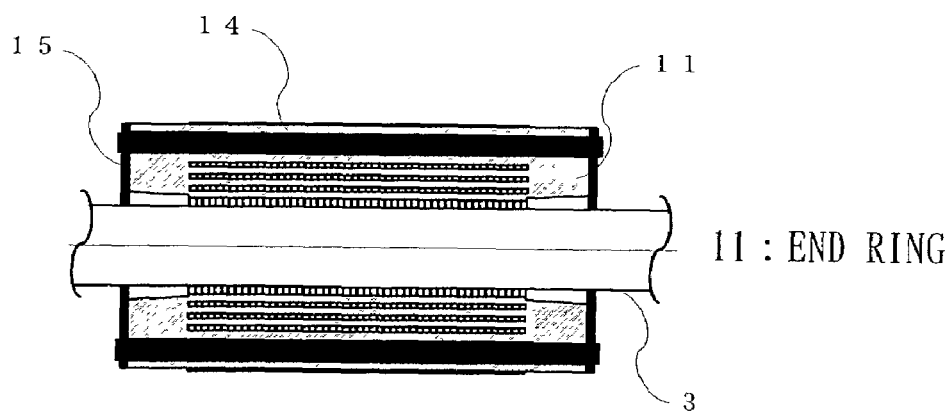
FIGS. 9A and 9B show a rotor to which the fixing member is fixed according to the third embodiment.
Figure 9B:
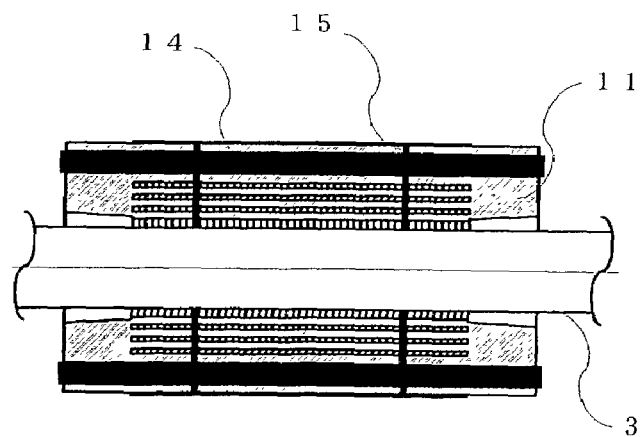

FIGS. 6A and 6B, 7, 8A, 8B, 9A, and 9B show the third embodiment of the invention. An element having the same sign as the one as explained in the first embodiment has the same function, so that an explanation is omitted here. FIGS. 6A and 6B are cross sections of a rotor of a synchronous induction motor; FIG. 7 is a cross section of a rotor of a synchronous induction motor, of which plural slots are filled with supporting member; FIGS. 8A and 8B show fixing member; FIGS. 9A and 9B show a rotor to which the fixing member is fixed.

In FIGS. 6A and 6B, a reference numeral 14 shows supporting member made of such as SUS (stainless steel) which is inserted into the slot 13. As the rotor 1 rotates, the centrifugal force is generated at the rotor and the stress is acted on each connection part. At this time, some warp is produced on the thin connection part, and the rotor 1 as a whole tends to bulge upward/downward in FIG. 6A.

As shown in FIG. 6A, the supporting member 14 is inserted into the slot 13, which is located at a position where the rotor bulges out the most with the centrifugal force, so that a bulge of a core is received by the aluminum filled in the slot 13, and is further received by the supporting member 14 inserted into the aluminum. Within the supporting member 14, upper/lower end rings 11 receives the stress. Since the stress received by the end rings 11 is dispersed over the end rings 11, so that the centrifugal force which has been received by the core is now received by the whole rotor through the supporting member, and the bulge due to the centrifugal force can be suppressed.

The supporting member 14 is inserted into the rotor 1, then the filler such as aluminum is filled by the usual die casting method, etc. Namely, the present embodiment can be performed using the conventional process.

The effect of the third embodiment can be enhanced by combining the first and the second embodiments.

If the centrifugal force is too large to support by the supporting member 14 as shown in FIG. 6A, the supporting member can be also inserted into another slot 13 as shown in FIG. 7. There is no problem if the number, the thickness, or the inserting position of the supporting member 14 is changed according to the number of rotations of the rotor or the properties of the motor.

In the third embodiment, only the supporting member 14 is inserted into the slot 13, a fixing member 15, which is provided with a supporting member inserting hole 17 so as to bond the supporting member by press-fit, etc. as shown in FIG. 8A, can be provided at the both ends of the rotor to fix the supporting member 14 as shown in FIGS. 9A and 9B. This further increases the strength of the rotor. If the fixing member 15 is fixed at an output axis inserting hole 18 by fixing the output axis by press-fit, etc., which further increases the strength.

When the fixing member 14 is placed not only at the both ends of the rotor but inside the rotor in the axial direction as shown in FIG. 9B, the same effect can be obtained. In this case, a part of the blanking steel plate of the rotor 1 can be the fixing member 15.

After laminating the rotor core, the supporting member 14 and the fixing member 15 are fixed, the filler can be filled by the die casting method, etc. Accordingly, the rotor of the embodiment can be produced using the conventional process without a big change.

Further, as shown in FIG. 8B, by eliminating a portion without the supporting member inserting hole 17, it is possible to facilitate to fill aluminum, etc. by the die casting method.

The third embodiment has been explained in which the supporting member 14 is SUS, however, material other than SUS such as copper can be used to obtain the same effect as long as it stands the centrifugal force. Further, the supporting member 14 can be conductive or nonconductive to obtain the same effect, which enables to decide the material freely according to the properties of the motor.

In the third embodiment, the supporting member 14 is placed at the center of the slot 13, however, the supporting member 14 can be contacted to the slot 13 to obtain the same effect, since the material for the supporting member 14 can be any material regardless of the attributes such as the conductivity as long as the material has enough strength to stand the centrifugal force.

In the third embodiment, in order that the secondary resistance is reduced by making a part of the secondary current running in the slot 13 run into the slit 2 to generate induction torque and that the reluctance torque is increased by making the slot 13 have a function of the slit 2 to generate reluctance torque, the slit and the slot are connected with a continuous curve. However, another shape can be employed to attain the same effect in which the slit and the slot are connected with a narrow portion or the slit and the slot are separated. In this case, the stress, which has been received by only the connection part of the slot 13, can now be received also by a part which separates the slit and the slot. Therefore, the strength of the rotor can be increased.

Since the synchronous induction motor employing such a rotor does not generate rotor copper loss of the rotor at synchronous operation, which enables the synchronous induction motor to drive at a high efficiency. Accordingly, the synchronous induction motor of the embodiment is suitable to use in a fan motor, a compressor, an air conditioner, a refrigerator, and so on.

Embodiment 4

Figure 10A:
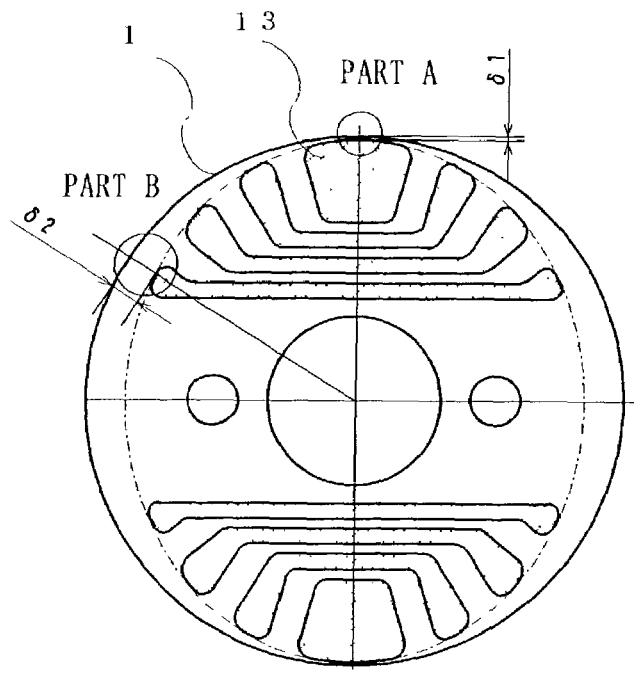
FIGS. 10A and 10B are cross sections of a rotor according to the fourth embodiment.
Figure 10B:
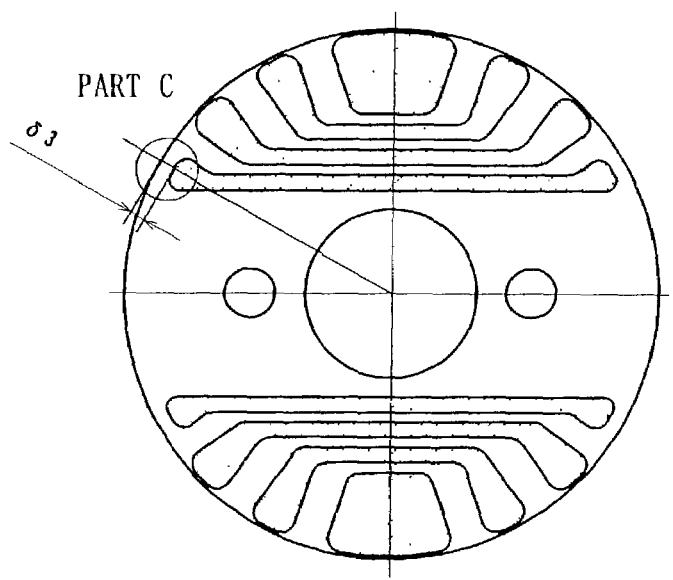
Figure 11:
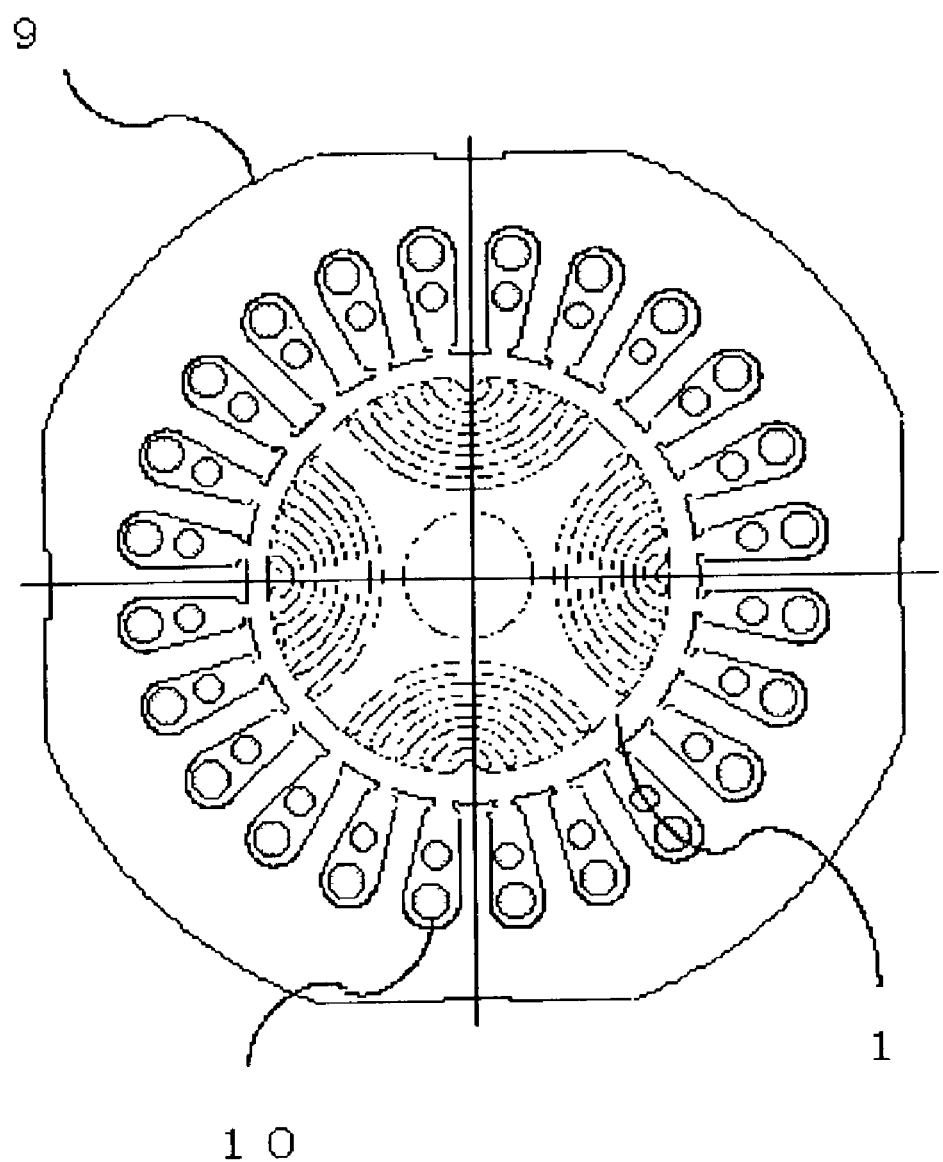
FIG. 11 is a cross section of a conventional synchronous motor viewed from an output axis side.
Figure 12:
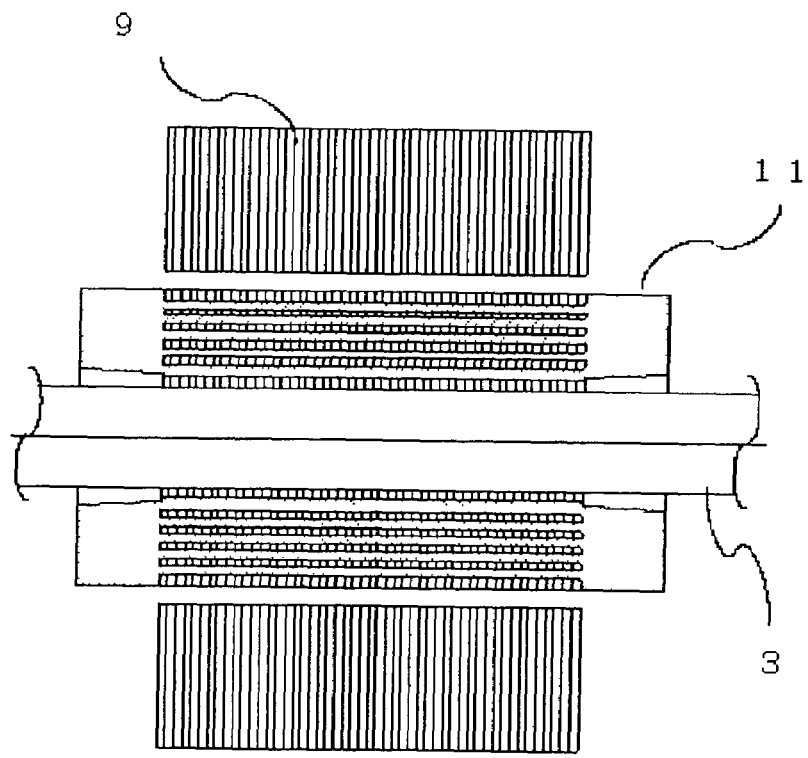
FIG. 12 is a cross section of a conventional synchronous motor viewed from a side of the output axis.
Figure 13:
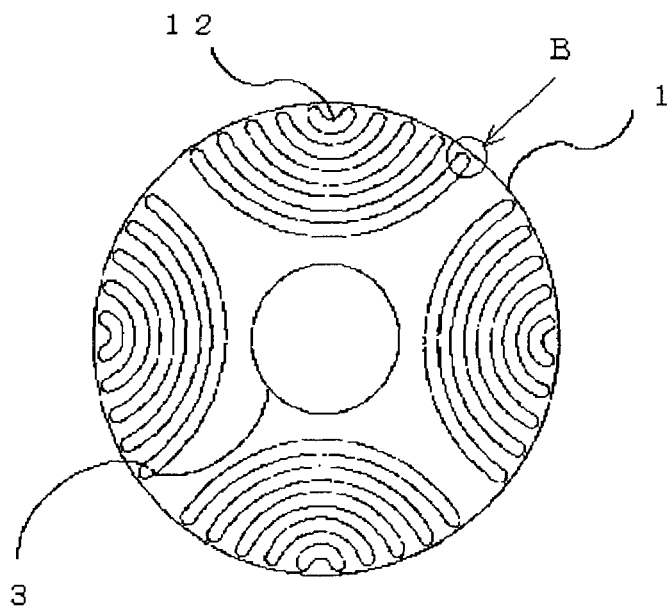
FIG. 13 is a cross section of rotor of a conventional synchronous motor.

FIGS. 10A and 10B are cross sections of the rotor, showing the fourth embodiment of the present invention. An element having the same sign as the one as explained in the first embodiment has the same function, so that an explanation is omitted here. As shown in the figure, the both ends of the slit 2 and the slot 13 are connected by the connection part so as not to separate the rotor 1 by the slit 2 and the slot 13. The centrifugal force generated by the rotation of the rotor is constructionally received by the connection part.

It is necessary to thicken the connection part so as not to distort the rotor 1 due to the centrifugal force. However, if the connection part is made thick, the magnetic force, which has been flown from the magnetic pole of the rotor 1 to the next magnetic pole through a path between the slits, is now flown also into the connection part, which deteriorates the performance of the motor.

Consequently, instead of thickening the connection part uniformly, a part A of FIG. 10A, which receives the least influence of the centrifugal force, is made to have a width of $\delta1$, which is the least width to stand the centrifugal force, and a part B of FIG. 10A, which receives the most influence of the centrifugal force, is made to have a width of $\delta2$ ($\delta2>\delta1$), and the connection part is made to have an elliptic connection width to cover $\delta1$ and $\delta2$. It is possible to make the part A of the connection part very thin, since it is sufficient only to stand the centrifugal force due to the aluminum filled in the slot 13 adjacent to the part A. Therefore, the magnetic flux which flows this part can be made the same amount as the one of the conventional rotor.

Accordingly, if the part B of the connection parts of FIG. 10A is made thick, the amount of magnetic flux flowing in the connection part can be largely decreased compared with a case when the connection part is made thick as a whole, and further, the bulge due to the centrifugal force can be suppressed.

Further, it is possible to produce the rotor of the present embodiment using the conventional manufacturing process with the same cost by only replacing the die of the rotor.

The effect of the third embodiment can be enhanced by combining the first through third embodiments.

In the present embodiment, the shape of all blanking steel plates for the rotor are formed identical, however, the same effect can be attained if an arbitrary piece of the blanking steel plates of the rotor is made to have the above form. In this case, it is necessary to adjust a position for inserting the arbitrary piece of the blanking steel plates having the above form according to the number of rotations of the rotor or the properties of the motor.

Further, in the fourth embodiment, aluminum is used for the filler, however, the same effect can be obtained by using another nonmagnetic conductive material such as copper.

In the fourth embodiment, in order that the secondary resistance is decreased by making the secondary current running in the slot 13 run into the slit 2 to generate induction torque and that the reluctance torque is increased by making the slot 13 have a function of the slit 2 to generate reluctance torque, the slit and the slot are connected with a continuous curve. However, another shape can be employed to attain the same effect in which the slit and the slot are connected with a narrow portion or the slit and the slot are separated as shown in FIG. 1B. In this case, the same effect can be obtained when an outer side of a space which separates the slit and the slot is made circular and an inner side of the space is made elliptic. Further, the stress, which has been received by only the connection part of the slot 13, can now be received also by the space between the slit and the slot. Therefore, the strength of the rotor can be further increased.

Further, in the present embodiment, the connection part is made ellipse, however, another shape can be employed in which only a part C of the innermost part of the connection part is made δ3 being thicker than other part of the connection part as shown in FIG. 10B. Or not only the innermost part but also the second innermost part of the connection part can be made thick as well. In this case, at least one part of the connection part must have the least thickness so as to keep the properties of the motor.

Since the synchronous induction motor employing such a rotor does not generate rotor copper loss of the rotor at synchronous operation, which enables the synchronous induction motor to drive with a high efficiency. Accordingly, the synchronous induction motor is suitable to use in a fan motor, a compressor, an air conditioner, a refrigerator, and so on.

According to the suitable embodiment of the present invention, a rotor for a synchronous induction motor having a slot for generating induction torque and a slit for generating reluctance torque, the slit is provided with at least one of a convex and a concave so as to receive centrifugal force which is generated due to rotation of the rotor and acts on a part of the rotor outside the slit and the filler so as to become projected to outside from a center side of the rotor by mechanical bondage of the filler and a rotor core. Consequently, the concentration of the stress on the connection part of the rotor core at the end part of the slit or the slot can be released, and it is possible to stand the centrifugal force due to the high-speed rotation without deteriorating the properties of the motor by a simple structure.

In the rotor for the synchronous induction motor of the suitable embodiment of the invention, a shape of the convex and the concave are made to have a wedge form in which a top part is wider than a bottom part, so that the convex and the concave of the wedge form can receive centrifugal force which is generated due to rotation of the rotor and acts on a part of the rotor outside the slit and the filler so as to bulge toward the outside from the center side of the rotor.

In the rotor for the synchronous induction motor of the suitable embodiment of the invention, a shape of the convex and the concave are made circular, so that the convex and the concave of the circular form can receive centrifugal force which is generated due to rotation of the rotor and acts on a part of the rotor outside the slit and the filler so as to bulge toward the outside from the center side of the rotor.

In the rotor for the synchronous induction motor of the suitable embodiment of the invention, a shape of the convex and the concave are made T-shape, so that the convex and the concave of the T-shape can receive centrifugal force which is generated due to rotation of the rotor and acts on a part of the rotor outside the slit and the filler so as to bulge toward the outside from the center side of the rotor.

In the rotor for the synchronous induction motor of the suitable embodiment of the invention, a shape of the convex and the concave are made L-shape, so that the convex and the concave of the L-shape can receive centrifugal force which is generated due to rotation of the rotor and acts on a part of the rotor outside the slit and the filler so as to bulge toward the outside from the center side of the rotor.

In the rotor for the synchronous induction motor of the suitable embodiment of the invention, a slit of the center side of the rotor is provided with at least one of a convex and a concave, so that the stress acted on the connection part at both ends of the slot or the slit of the center side of the rotor, on which the stress is concentrated the most, can be relieved.

In the rotor for the synchronous induction motor of the suitable embodiment of the invention, plural convexes or plural concaves are provided at one side of the slit, so that the stress acted on the connection part at both ends of the slot or the slit can be further relieved.

In the rotor for the synchronous induction motor of the suitable embodiment of the invention, a convex is provided at one side of the slit and a concave is provided at the opposite side of the slit so as to place the convex and the concave to keep a magnetic path between the slits so that the stress acted on the connection part at both ends of the slot or the slit can be relieved and the magnetic path between the slits can be kept.

In the rotor for the synchronous induction motor of the suitable embodiment of the invention, wherein at least one of a convex and a concave is provided at plural slits, so that the stress acted on the connection part of the slot or the slit can be further relieved.

In the rotor for the synchronous induction motor of the suitable embodiment of the invention, the slot is placed both ends of the slit at outer peripheral side of the rotor, and the slot and the slit are connected, which enables to simplify the structure of the rotor.

In the rotor for the synchronous induction motor of the suitable embodiment of the invention, the slot and the slit are connected with a continuous curve, which enables to simplify the form of the die.

In the rotor for the synchronous induction motor of the suitable embodiment of the invention, a narrow part is provided between the slot and the slit, so that a functional difference between the slot and the slit can be clarified.

In the rotor for the synchronous induction motor of the suitable embodiment of the invention, the slot and the slit are separated, so that different material can be filled in the slot and the slit, respectively.

In the rotor for the synchronous induction motor of the suitable embodiment of the invention which is formed by laminating blanking steel plates, an arbitrary part the rotor in the axial direction has a structure, which increases freedom in manufacturing, wherein the structure of the rotor for a synchronous induction motor having a slot for generating induction torque and a slit for generating reluctance torque and filling the slit with a filler, wherein the slit is provided with at least one of a convex and a concave so as to receive centrifugal force, which is generated due to rotation of the rotor and acts on a part of the rotor outside the slit and the filler so as to bulge toward an outside from a center side of the rotor, by mechanical bondage of the filler and a rotor core.

In the rotor for the synchronous induction motor of the suitable embodiment of the invention, one of or both of the slot and the slit are filled with nonmagnetic conductive material, which facilitates the manufacturing.

In the rotor for the synchronous induction motor of the suitable embodiment of the invention, one of or both of the slot and the slit are filled with aluminum, which facilitates the manufacturing.

In the rotor for the synchronous induction motor of the suitable embodiment of the invention, one of or both of the slot and the slit are filled with copper, which facilitates the manufacturing.

In the rotor for the synchronous induction motor of the suitable embodiment of the invention, the slot is filled with nonmagnetic conductive material, and the slit is filled with nonmagnetic material or material having low magnetic permeability, which increases freedom in manufacturing.

In the rotor for the synchronous induction motor of the suitable embodiment of the invention, a supporting member is inserted into the conductive material within the slot, and the supporting member is made to receive centrifugal force, which is generated due to rotation of the rotor and acts on a part of the rotor outside the slit and the filler so as to bulge toward the outside from the center side of the rotor, which enables to suppress the bulge of the rotor due to the centrifugal force.

In the rotor for the synchronous induction motor of the suitable embodiment of the invention, the supporting member is inserted into the slot which is located at a part where the rotor bulges out the most due to the centrifugal force, which enables to largely suppress the bulge of the rotor due to the centrifugal force.

In the rotor for the synchronous induction motor of the suitable embodiment of the invention, the supporting member is inserted into plural slots, which enables to further suppress the bulge of the rotor due to the centrifugal force.

In the rotor for the synchronous induction motor of the suitable embodiment of the invention, the supporting member is formed by SUS, which enables to surely suppress the bulge of the rotor due to the centrifugal force.

In the rotor for the synchronous induction motor of the suitable embodiment of the invention, the supporting member is formed by copper, which influence little the induction torque.

In the rotor for the synchronous induction motor of the suitable embodiment of the invention, an end ring which short-circuits conductive material of the slot is provided at both ends of the slot in the axial direction, and the end ring supports the supporting member, so that the rotor as a whole can suppress the bulge of the rotor due to the centrifugal force.

In the rotor for the synchronous induction motor of the suitable embodiment of the invention, the supporting member is inserted adjacent a center of the slot, so that the supporting member can receive the bulge of the conductive material within the slot due to the centrifugal force.

In the rotor for the synchronous induction motor of the suitable embodiment of the invention, the supporting member is inserted so as to contact to the slot, so that the supporting member can receive the bulge due to the centrifugal force.

In the rotor for the synchronous induction motor of the suitable embodiment of the invention, a fixing member having an inserting hole for the supporting member is provided at a predetermined position of the rotor, and the supporting member is inserted and fixed to the inserting hole, which increases the strength of the rotor.

In the rotor for the synchronous induction motor of the suitable embodiment of the invention, the fixing member is provided at both ends of the rotor in an axial direction, which increases the strength of the rotor.

In the rotor for the synchronous induction motor of the suitable embodiment of the invention, the fixing member is provided inside the rotor in the axial direction, so that a part of the rotor core can function as the fixing member.

In the rotor for the synchronous induction motor of the suitable embodiment of the invention, a part of the fixing member in which the inserting hole for the supporting member is not provided is eliminated, which facilitates to fill with the conductive material using the die casting method.

In the rotor for the synchronous induction motor of the suitable embodiment of the invention, an output axis inserting hole is provided at the fixing member, and an output axis is fixed to the output axis inserting hole, which further increases the strength of the rotor.

In the rotor for the synchronous induction motor of the suitable embodiment of the invention, the slot is filled with conductive material, the supporting member is inserted into the conductive material within the slot, and the supporting member is made to receive centrifugal force, which is generated due to rotation of the rotor and acts on a part of the rotor outside the slit and the filler so as to bulge toward the outside from the center side of the rotor, so that the concentration of the stress on the connection part of the rotor core at the end part of the slit or the slot can be relieved and the bulge of the rotor due to the centrifugal force can be suppressed.

In the rotor for the synchronous induction motor of the suitable embodiment of the invention, one of the connection parts, on which a stress due to centrifugal force acted on a part of the rotor outside the slit and the filler so as to bulge toward the outside from the center side of the rotor is concentrated, is made thick, and the other of the connection parts is made gradually thin toward the connection part on which the stress is not concentrated, so that the bulge of the rotor due to the centrifugal force can be suppressed.

The rotor for the synchronous induction motor of the suitable embodiment of the invention is formed so that a curve connecting end parts of the connection part at the center side of the rotor becomes ellipse, which enables to suppress the bulge of the rotor due to the centrifugal force.

In the rotor for the synchronous induction motor of the suitable embodiment of the invention, only one of the connection parts, on which the stress due to centrifugal force is concentrated, is made thicker than the other of the connection parts, which enables to suppress the bulge of the rotor due to the centrifugal force.

In the rotor for the synchronous induction motor of the suitable embodiment of the invention, not only the one of the connection parts on which the stress due to centrifugal force is concentrated but also a part of the connection part on which the stress is secondarily concentrated is made thicker than the other of the connection parts, which enables to further suppress the bulge of the rotor due to the centrifugal force.

In the rotor for the synchronous induction motor of the suitable embodiment of the invention, at least one of the connection parts is made to have the least thickness so as to keep properties of the synchronous induction motor, which reduces a possibility to deteriorate the properties of the motor.

In the rotor for the synchronous induction motor of the suitable embodiment of the invention, both ends of the slot or the slit are connected with a connection part so as not to separate a rotor core because of the slot and the slit, one of the connection parts, on which a stress due to centrifugal force acted on a part of the rotor outside the slit and the filler so as to bulge toward the outside from the center side of the rotor is concentrated, is made thick, and the connection parts are made gradually thin toward the other of the connection parts on which the stress is not concentrated, which enables to further suppress the bulge of the rotor due to the centrifugal force.

In the rotor for the synchronous induction motor of the suitable embodiment of the invention, both ends of the slot or the slit are connected with a connection part so as not to separate a rotor core because of the slot and the slit, one of the connection parts, on which a stress due to centrifugal force acted on a part of the rotor outside the slit and the filler so as to bulge toward the outside from the center side of the rotor is concentrated, is made thick, and the connection parts are made gradually thin toward the other of the connection parts on which the stress is not concentrated, which enables to further suppress the bulge of the rotor due to the centrifugal force.

According to the suitable embodiment of the present invention, a synchronous induction motor employs the rotor for the synchronous induction motor is used, which enables to stand a high-speed rotation of the motor.

According to the suitable embodiment of the present invention, a fan motor employs the synchronous induction motor, which enables to stand a high-speed rotation of the motor.

According to the suitable embodiment of the present invention, a compressor employs the synchronous induction motor, which enables to stand a high-speed rotation of the motor.

According to the suitable embodiment of the present invention, an air conditioner, in which the fan motor employing the synchronous induction motor and the compressor employing the synchronous induction motor are mounted, which enables to drive at a high speed, respectively.

According to the suitable embodiment of the present invention, a refrigerator, in which the fan motor employing the synchronous induction motor and the compressor employing the synchronous induction motor are mounted, which enables to drive at a high speed, respectively.

In the rotor for the synchronous induction motor of the suitable embodiment of the invention, a slot is provided at a position which is the furthest from a center of an inner periphery of the rotor, and a slit is provided at a position which is the same as the slot or inside the slot, which enables to effectively generate the induction torque and the reluctance torque.

What is claimed is:

1. A rotor for a synchronous induction motor comprising:
   a rotor core;
   at least one slot containing a first filler and configured to generate induction torque; and
   at least one slit containing a second filler and configured to generate reluctance torque, the at least one slit having a radially innermost surface provided with a radially aligned convex or concave anchor configured to interlockingly connect the second filler with the rotor core, and at least one non-radially aligned convex or concave anchor.

2. The rotor for the synchronous induction motor of claim 1, wherein a shape of the convex or concave anchor is a wedge form in which a top part is wider than a bottom part.

3. The rotor for the synchronous induction motor of claim 1, wherein a shape of the convex or concave anchor is circular.

4. The rotor for the synchronous induction motor of claim 1, wherein a shape of the convex or concave anchor is T-shaped.

5. The rotor for the synchronous induction motor of claim 1, wherein a shape of the convex or concave anchor is L-shaped.

6. The rotor for the synchronous induction motor of claim 1, wherein said at least one slit comprises a plurality slits configured to generate reluctance torque, each slit located in a sector of said rotor bounded by radii corresponding to two adjacent poles of said rotor, said radially aligned anchor and said at least one non-radially aligned anchor provided on the radially innermost surface of the radially innermost slit.

7. The rotor for the synchronous induction motor of claim 6, wherein the radially innermost surface of the radially innermost slit comprises plural anchors, including said radially aligned anchor and said at least one non-radially aligned anchor.

8. The rotor for the synchronous induction motor of claim 6, wherein each slit between said rotor poles includes at least one convex or concave anchor configured to interlockingly connect with the rotor core.

9. The rotor for the synchronous induction motor of claim 8, wherein each successively radially inner slit includes a greater or equal number of anchors than a preceding, radially outer slit.

10. The rotor for the synchronous induction motor of claim 1, further comprising a radially aligned convex anchor on a radially outermost side of the at least one slit.

11. The rotor for the synchronous induction motor of claim 1, wherein at least one slot is placed at each end of the at least one slit at an outer peripheral side of the rotor, and the slots located at ends of the at least one slit and the at least one slit are connected.

12. The rotor for the synchronous induction motor of claim 11, wherein the slots located at the ends of the at least one slit and the at least one slit are connected with a continuous curve.

13. The rotor for the synchronous induction motor of claim 11, further comprising a narrow part between the slots located at the ends of the at least one slit and the at least one slit.

14. The rotor for the synchronous induction motor of claim 11, wherein one of or both of the slots located at the ends of the at least one slit and the at least one slit is filled with nonmagnetic conductive material.

15. The rotor for the synchronous induction motor of claim 14, wherein one of or both of the slots located at the ends of the at least one slit and the at least one slit is filled with aluminum.

16. The rotor for the synchronous induction motor of claim 14, wherein one of or both of the slots located at the ends of the at least one slit and the at least one slit is filled with copper.

17. The rotor for the synchronous induction motor of claim 1, wherein at least one slot is placed at each end of the at least one slit at an outer peripheral side of the rotor, and the slots located at the ends of the at least one slit and the at least one slit are separated.

18. The rotor for the synchronous induction motor of claim 17, wherein the slots located at the ends of the at least one slit are filled with nonmagnetic conductive material, and the at least one slit is filled with nonmagnetic material or material having low magnetic permeability.

19. A rotor for a synchronous induction motor which is formed by laminating a blanking steel plate, wherein an arbitrary part of the rotor in an axial direction has a structure of claim 1.

20. The rotor for the synchronous induction motor of claim 1, wherein the at least one slot is filled with conductive material, a supporting member is inserted into the conductive material within the at least one slot, and the supporting member is made to receive centrifugal force which is generated due to rotation of the at least one slot and acts on a part of the rotor outside the at least one slit and the second filler so as to bulge toward an outside from a center side of the rotor.

21. The rotor for the synchronous induction motor of claim 20, wherein the rotor has plural slots and plural slits, wherein both ends of the slots or the slits are connected with connection parts so as not to separate a rotor core because of the slots and the slits, wherein one of the connection parts, on which a stress due to centrifugal force acted on a part of the rotor outside the slits and the second filler so as to bulge toward the outside from the center side of the rotor is concentrated, is made thick, and wherein the connection parts are made gradually thin toward the connection parts on which the stress is not concentrated.

22. A synchronous induction motor employing the rotor for the synchronous induction motor of claim 1.

23. A fan motor employing the synchronous induction motor of claim 22.

24. A compressor employing the synchronous induction motor of claim 22.

25. An air conditioner in which a fan motor employing the synchronous induction motor of claim 22 and a compressor employing the synchronous induction motor of claim 22 are mounted.

26. A refrigerator in which a fan motor employing the synchronous induction motor of claim 22 and a compressor employing the synchronous induction motor of claim 22 are mounted.

27. The rotor for the synchronous induction motor of claim 1, wherein a slot is provided at a position which is the furthest from a center of an inner periphery of the rotor, and a slit is provided at a position which is the same as the slot or inside the slot.

28. A rotor for a synchronous induction motor comprising:

a rotor core;

a plurality of slots containing a first filler and configured to generate induction torque; and a plurality of slits containing a second filler and configured to generate reluctance torque, at least one slit having a radially innermost surface provided with a radially aligned convex or concave anchor configured to interlockingly connect the second filler with the rotor core, wherein both ends of the slots or the slits are connected with connection parts so as not to separate the rotor core because of the slots or the slits, wherein one of the connection parts, on which a stress due to centrifugal force acted on a part of the rotor outside the slits and the second filler so as to bulge toward an outside from a center side of the rotor is concentrated, is made thick, and wherein the connection parts are made gradually thin toward the connection parts on which the stress is not concentrated such that ends of the slits lie on an ellipse.

* * * * *